United States Patent
Mimoun et al.

(10) Patent No.: US 10,696,587 B2
(45) Date of Patent: Jun. 30, 2020

(54) GLASS SHEET WITH IDENTIFICATION CODE

(71) Applicant: SAINT-GOBAIN GLASS FRANCE, Courbevoie (FR)

(72) Inventors: Emmanuel Mimoun, Boulogne Billancourt (FR); Brice Dubost, Courbevoie (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/117,799

(22) PCT Filed: Dec. 19, 2014

(86) PCT No.: PCT/FR2014/053480
§ 371 (c)(1),
(2) Date: Aug. 10, 2016

(87) PCT Pub. No.: WO2015/121548
PCT Pub. Date: Aug. 20, 2015

(65) Prior Publication Data
US 2017/0008798 A1    Jan. 12, 2017

(30) Foreign Application Priority Data
Feb. 11, 2014 (FR) .................................. 14 51028

(51) Int. Cl.
*C03C 23/00* (2006.01)
*B23K 26/00* (2014.01)
(Continued)

(52) U.S. Cl.
CPC ...... *C03C 23/0025* (2013.01); *B23K 26/0006* (2013.01); *B23K 26/361* (2015.10);
(Continued)

(58) Field of Classification Search
CPC .............. H01L 21/67294; G06K 17/00; G06K 19/06028; C03C 23/0025; B23K 26/361;
(Continued)

(56) References Cited

U.S. PATENT DOCUMENTS

2001/0003628 A1* 6/2001 Demiryont .............. C03C 17/36
428/630
2008/0304525 A1 12/2008 Kupisiewicz et al.
2014/0094948 A1* 4/2014 Peyrude ................ C03B 33/037
700/106

FOREIGN PATENT DOCUMENTS

EP         1 589 404 A1     10/2005
WO   WO 2012/174545 A1    12/2012
(Continued)

OTHER PUBLICATIONS

Merriam Webster—squashed; https://www.merriam-webster.com/dictionary/squashed; Oct. 27, 2018 (Year: 2018).*
(Continued)

*Primary Examiner* — Humera N Sheikh
*Assistant Examiner* — Elizabeth D Ivey
(74) *Attorney, Agent, or Firm* — Pillsbury Winthrop Shaw Pittman LLP

(57) ABSTRACT

A glass sheet includes a symbol marked in the interior of the glass, the symbol forming a code. The symbol is marked in at least two dimensions including the dimension of the thickness of the glass sheet, portions of the symbol being marked at various depths in the thickness of the glass sheet.

19 Claims, 3 Drawing Sheets

(51) Int. Cl.
  *B23K 26/53* (2014.01)
  *B41M 5/26* (2006.01)
  *B23K 26/362* (2014.01)
  *B41M 3/00* (2006.01)
  *B23K 26/361* (2014.01)
  *B23K 103/00* (2006.01)

(52) U.S. Cl.
  CPC ............ *B23K 26/362* (2013.01); *B23K 26/53* (2015.10); *B41M 3/003* (2013.01); *B41M 5/262* (2013.01); *B23K 2103/54* (2018.08)

(58) Field of Classification Search
  CPC .. B23K 26/53; B23K 26/362; B23K 2203/54; B41M 3/003; B41M 5/262
  See application file for complete search history.

(56) References Cited

FOREIGN PATENT DOCUMENTS

WO     WO 2012164200 A1 * 12/2012   ........... C03B 33/037
WO     WO 2012174545 A1 * 12/2012   ........... B23K 26/048

OTHER PUBLICATIONS

International Search Report as issued in International Patent Application No. PCT/FR2014/053480, dated Mar. 19, 2015.
Kawashima, H., et al., "Invisible Two-dimensional Barcode Fabrication inside a Synthetic Fused Silica by Femtosecond Laser Processing Using a Computer-generated Hologram," SPIE, vol. 7925, Dec. 31, 2011, XP040553983, pp. 79251C-1-79251C-9.

\* cited by examiner

GLASS SHEET WITH IDENTIFICATION CODE

CROSS-REFERENCE TO RELATED APPLICATIONS

This application is the U.S. National Stage of PCT/FR2014/053480, filed Dec. 19, 2014, which in turn claims priority to French Application No. 1451028, filed Feb. 11, 2014. The contents of all of these applications are incorporated herein by reference in their entirety.

The present invention relates to the field of identification codes marked on glass sheets.

It is possible to use one-dimensional "barcode" type symbols or analogous symbols and two-dimensional "Data Matrix" type symbols or analogous symbols as codes for identification of glass panels.

These codes may contain any type of information such as, for example, a number serving to identify the glass sheet. Information such as the manufacturing site or the time and date of manufacture may also be integrated, as well as information of any other suitable type.

The symbols are for example marked by means of a laser beam of any suitable type, preferably oriented perpendicularly to the glass sheet, i.e. to the general plane of the glass sheet. Specifically, the symbols thus marked are generally intended to be read from in front by positioning a device facing the symbol, and therefore facing one of the two main faces of the glass sheet.

However, such symbols are not intended to be read when the glass sheets are stacked.

One aim of the invention is to make it possible to read rapidly codes present on glass sheets, whether the glass sheets be separate or stacked.

According to one aspect of the invention, a glass sheet comprises a symbol marked in the interior of the glass, the symbol forming a code, the symbol being marked in at least two dimensions including the dimension of the thickness of the glass sheet, portions of the symbol being marked at various depths in the thickness of the glass sheet.

Particular embodiments of the glass sheet may furthermore comprise one or more of the following features or one or more technically feasible combinations of the following features:
- each portion of the symbol is at a unique depth that is different from the depth of the other rows and other columns, respectively;
- the various portions correspond to a sectioning of the symbol into various sections that are preferably rectilinear and parallel;
- at least certain sections correspond to rows or columns of the symbol;
- the symbol is two-dimensional and for example of the Data Matrix, QR Code or analogous type;
- the symbol is parallel or perpendicular to the closest edge face of the glass sheet;
- the symbol is marked in a plane inclined relative to an edge face of the glass sheet and to a main face of the glass sheet such that it is identically readable both via the main face of the glass sheet and via the edge face of the glass sheet; and
- said inclined plane is at 45° to said edge face of the glass sheet and to said main face of the glass sheet.

The invention also relates to a method for marking a symbol forming a code in a glass sheet, comprising:
marking a first portion of the symbol at a first depth in the thickness of the glass sheet;
marking a second portion of the symbol at a second depth in the thickness of the glass sheet, said second depth being different to the first depth, the marking of the second portion being offset from the marking of the first portion in another dimension of the glass sheet such as the width or length dimension.

The invention also relates to a process for manufacturing a glazing product comprising a glass sheet such as described above, including a step of reading the code via the main face, at a first moment during manufacture, especially at a moment when the glass sheet is isolated, and a step of reading the code via the edge face, at a second moment during manufacture, especially at a moment when the glass sheet forms part of a stack of glass sheets.

The invention will be better understood on reading the following description, given merely by way of illustrative example, which refers to the appended drawings, in which.

Throughout the text, the expression "main face" 4 is understood to mean one of the two main faces of the glass sheet 2 and the expression "edge face" one of the four edge faces 6 forming the sides of the glass sheet 2.

Figure 1:
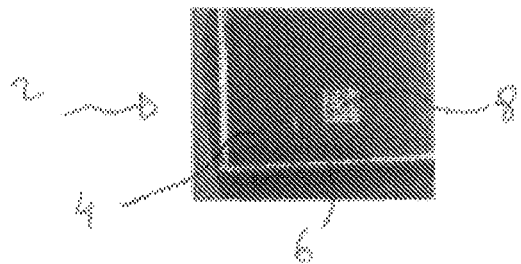
FIG. 1 is a photograph of a glass sheet, a Data Matrix type symbol being marked on the main face of the glass sheet.
Figure 2:
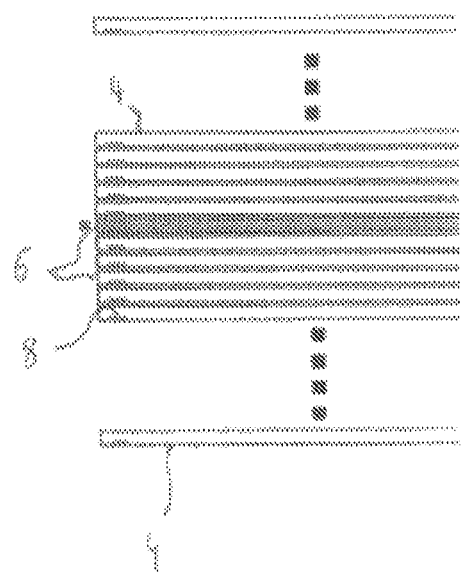
FIG. 2 is a schematic side view illustrating a stack of glass sheets of the type in FIG. 1.
Figure 3:
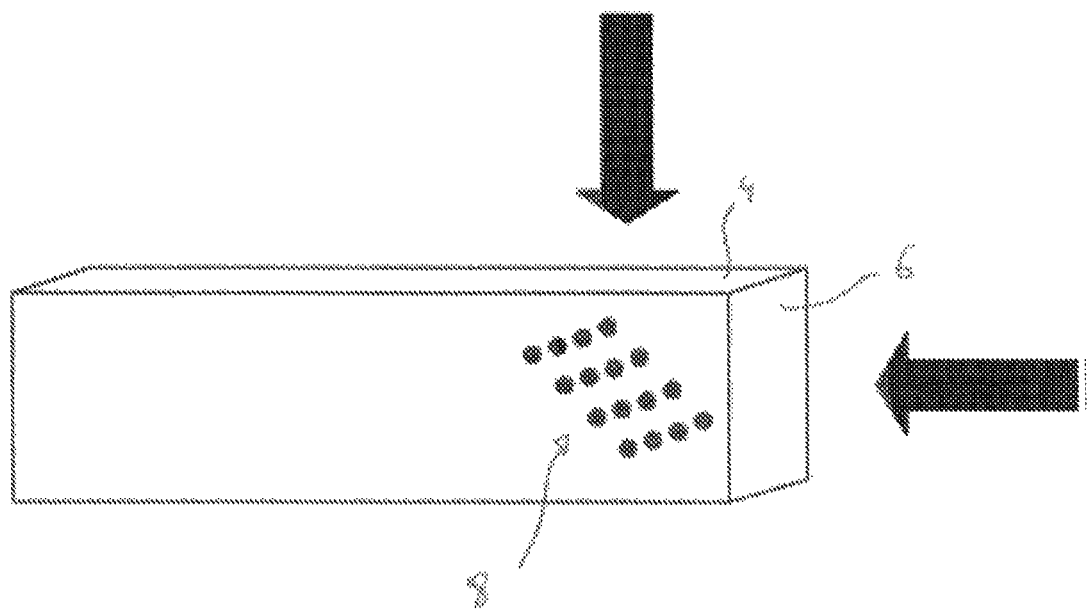
FIG. 3 is a schematic of a symbol marked in a glass sheet, according to one embodiment of the invention.

The example symbol 8 illustrated in FIG. 3 may be read rapidly, both via the main face and via the edge face.

Specifically, as may be seen in FIG. 3, the columns of the symbol 8 have been formed in the thickness of the glass sheet 2 at various depths, i.e. with each point of a column at the same depth.

Figure 4A:
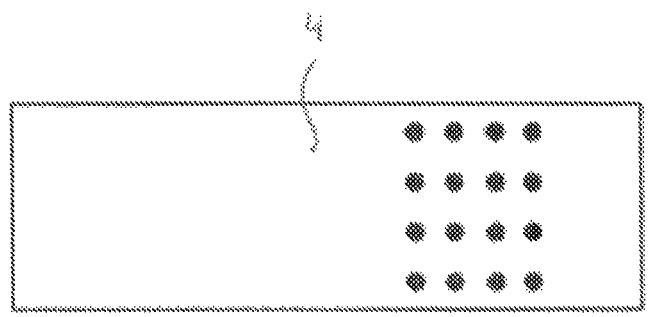
FIGS. 4a and 4b are views, via the main face and via the edge face, of the symbol in FIG. 3.
Figure 4B:
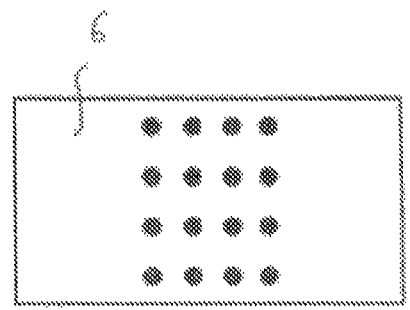

FIG. 4a is a view of the symbol via the main face, and FIG. 4b a view via the edge face. As may be seen, the symbol is squashed widthwise (i.e. in the direction of the thickness of the glass sheet, i.e. the rows are squashed) but remains automatically readable by a reading device.

To produce such a symbol, for each column the laser has been focused at different depths in the thickness of the glass sheet. Specifically, it is the focal point of the laser that determines the depthwise location of the marking in the glass sheet.

It will also be noted that the columns have been marked "stepwise" i.e. at depths that gradually decrease starting from the edge face. As a variant, it may be a question of increasing depths, or even of different depths of any type suitable for reading via the edge face.

As a variant, it is not the columns but the rows that are each marked at different depths.

In fact, if the columns are parallel to the closest edge face, columns each marked at different depths are preferred. If it is the rows that are parallel to the closest edge face, columns each marked at different depths are preferred. If the symbol is marked in a corner, and therefore in proximity to two edge faces, the edge face from which it is easiest to read the symbol will be preferred.

Furthermore, the symbol 8 is not necessarily parallel to the edge face. It is for example a question of a symbol 8 the columns of which make an angle of 45° to the edge face (i.e. obtained by a rotation of 45° in the plane of the symbol). In such a case, the symbol is for example "sectioned" into sections (or "portions") parallel to the closest edge face of the glass sheet, these sections of the symbol being marked at different depths, i.e. the points of each section are at the same depth. Thus, generally, the symbol 8 is sectioned into various sections that are marked at various depths in the thickness of the glass sheet.

As another variant, the sections are not parallel and have any suitable shape allowing the symbol to be read via the edge face.

Thus, generally, a plurality of portions of the symbol are marked at various depths in the thickness of the glass sheet.

Preferably, the symbol 8 is in a plane inclined at 45° to the closest edge face 6 and to a main face 4 such that it is identically readable both via the main face 4 of the glass sheet and via the edge face 6 of the glass sheet.

Figure 5:
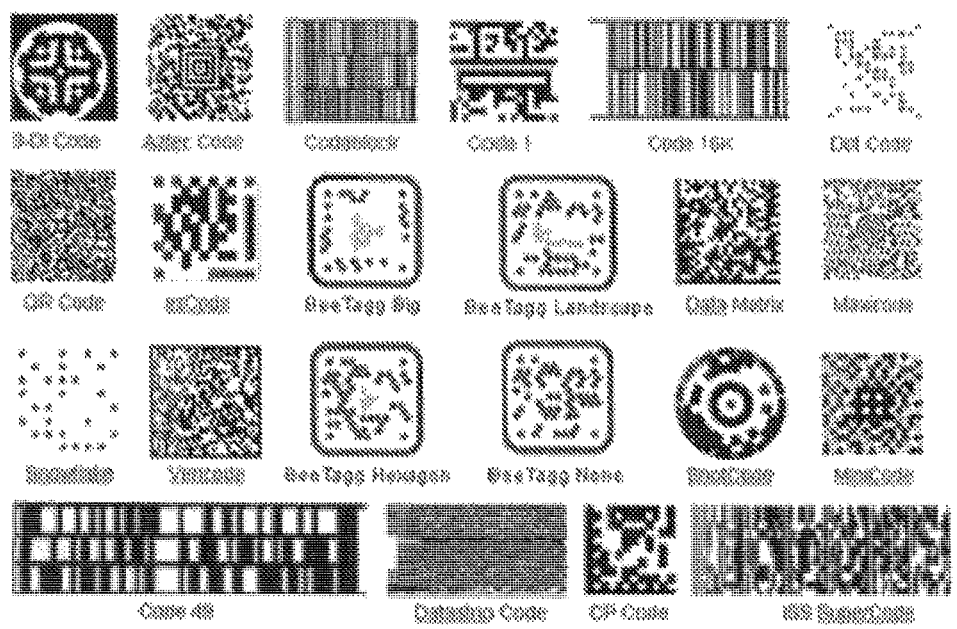
FIG. 5 illustrates various types of two-dimensional codes.

It will also be noted that the symbol does not have to be a symbol of the Data Matrix type. It may as a variant be a question of any type of suitable two-dimensional symbol. FIG. 5 illustrates other types of known codes, namely: 3-DI code, Aztex Code, Codablock, Code 1, Code 16K, Dot Code, QR Code, ezCode, BeeTagg Big, BeeTagg Landscape, Data Matrix, Maxicode, Snowflake, Vericode, BeeTagg Hexagon, BeeTagg None, ShotCode, MiniCode, Code 49, Datastrip Code, CP Code, and ISS SuperCode.

Generally, it is a question of a symbol forming a code of any suitable type.

One subject of the invention is thus a glass sheet 2 comprising a symbol marked in the interior of the glass, the symbol 8 forming a code, in which the symbol is marked in at least two dimensions including the dimension of the thickness of the glass sheet, portions of the symbol being marked at various depths in the thickness of the glass sheet.

Thus, the code may be readable both via the main face and via the edge face of the glass sheet.

The glass sheet 2 for example has a thickness comprised between 0.5 and 19 mm and especially between 2 and 12 mm-between 4 and 8 mm for example. However, as a variant the glass sheet may be any suitable thickness.

The symbol 8 is for example marked immediately after the float glass ribbon has been cut into large glass sheets, or immediately before or even during the cutting. The glass sheet then has a width larger than 2 meters and a length larger than 5 meters.

It is for example a question of soda-lime-silica glass but it may as a variant be any type of suitable glass.

Generally, it is a question of a glass sheet of any suitable type.

To carry out the marking of the code, a 2.5 W, 30 kHz, 10 ns pulse, (tripled YAG) pulsed UV laser scanned at 1 cm/s is for example used. By way of example, the laser is able to alter properties of the glass, such as its color or its refractive index, in locations where the points of the code must for example be colored (i.e. black points). Generally, it is a question of a laser of any type suitable for marking the bulk of the glass.

The marking device is for example programmed to mark the columns at different depths and parallel to the closest edge face.

The device is placed facing a main face of the glass sheet.

A first column is marked at a first focal distance corresponding to a first depth.

Next, a second column is marked at a larger focal distance, i.e. at a larger depth, and so on.

Generally, the method used is of any type suitable for producing a symbol according to the various embodiments of the invention.

If read via the edge face, in the case where the symbol is in a plane inclined at 45°, the symbol will be perceived identically as via the main face.

In the case where the glass sheet is of small thickness, and therefore where the angle of inclination of the symbol is small, the image seen via the edge face will be more deformed and the image seen via the main face less deformed. Reading devices will then have to be programmed to take this into account.

The invention claimed is:

1. A glass sheet comprising a symbol marked in an interior of the glass, the symbol forming a code containing information related to said glass sheet;
   wherein the symbol is marked in at least two dimensions including a dimension of a thickness of the glass sheet, portions of the symbol being marked at various depths in the thickness of the glass sheet such that the symbol is readable both via a main face of the glass sheet and via an edge face of the glass sheet thereby making said information readable both via the main face and the edge face of the glass sheet, and
   wherein the symbol is formed of a plurality of rectilinear sections, with each rectilinear section provided at a unique depth in the thickness of the glass sheet different from a depth of each of the other rectilinear sections of the plurality of rectilinear sections, each rectilinear section including at least three adjacent marking spots marked by laser, and wherein the plurality of rectilinear sections are arranged in the interior of the glass such that each marking spot of each rectilinear section is marked in the glass without being superposed with any of the marking spots of any other rectilinear sections of the plurality of rectilinear section when the symbol is seen from both the main face of the glass sheet and from the edge face of the glass sheet.

2. The glass sheet as claimed in claim 1, wherein the various portions correspond to a sectioning of the symbol into various sections that are rectilinear and parallel.

3. The glass sheet as claimed in claim 2, wherein at least certain sections correspond to rows or columns of the symbol.

4. The glass sheet as claimed in claim 1, wherein the symbol is two-dimensional and of the Data Matrix, QR Code or analogous type.

5. The glass sheet as claimed in claim 1, wherein the symbol is parallel or perpendicular to the closest edge face of the glass sheet.

6. The glass sheet as claimed in claim 1, wherein the symbol is marked in a plane inclined relative to the edge face of the glass sheet and to the main face of the glass sheet such that the symbol is identically readable both via the main face of the glass sheet and via the edge face of the glass sheet.

7. The glass sheet as claimed in claim 6, wherein said inclined plane is at 45° to said edge face of the glass sheet and to said main face of the glass sheet.

8. A method for marking a symbol forming a code in a glass sheet, the code containing information related to said glass sheet, the method comprising:
   marking a first portion of the symbol at a first depth in a thickness of the glass sheet, and
   marking a second portion of the symbol at a second depth in the thickness of the glass sheet, said second depth being different to the first depth, the marking of the second portion being offset from the marking of the first portion in another dimension of the glass sheet so that the symbol is readable both via a main face of the glass sheet and via an edge face of the glass sheet thereby making said information readable both via the main face and the edge face of the glass sheet, wherein the symbol is formed of a plurality of rectilinear sections, with each rectilinear section provided at a unique depth in the thickness of the glass sheet different from a depth of each of the other rectilinear sections of the plurality of rectilinear sections, each rectilinear section including at least three adjacent marking spots marked by laser, and wherein the plurality of rectilinear sections are arranged in the interior of the glass such that each marking spot of each rectilinear section is marked in the glass without being superposed with any of the marking spots of any other rectilinear sections of the plurality of rectilinear section when the symbol is seen from both the main face of the glass sheet and from the edge face of the glass sheet.

9. A process for manufacturing a glazing product comprising a glass sheet as claimed in claim 1, comprising reading the code via the main face of the glass sheet, at a first moment during manufacture, and reading the code via the edge face, at a second moment during manufacture.

10. The method as claimed in claim 8, wherein the other dimension of the glass sheet is a width or a length dimension.

11. The process as claimed in claim 9, wherein the first moment is a moment when the glass sheet is not stacked with other glass sheets and the second moment is a moment when the glass sheet forms part of a stack of glass sheets.

12. The glass sheet as claimed in claim 1, wherein the symbol is formed of a plurality of elements arranged in a pattern and the symbol, when read via the main face and the edge face, has a same arrangement of said plurality of elements.

13. The glass sheet as claimed in claim 1, wherein the plurality of rectilinear sections being are marked at depths in the glass sheet that decrease or increase starting from the edge face of the glass sheet.

14. The glass sheet as claimed in claim 1, wherein the symbol is marked in said at least two dimensions so as to appear shrunk in a direction of the thickness of the glass sheet when read both via the main face and the edge face of the glass sheet.

15. The glass sheet as claimed in claim 1, wherein the symbol has a same shape when read both via the main face and the edge face of the glass sheet.

16. The glass sheet as claimed in claim 1, wherein each rectilinear section is parallel to the closest edge face.

17. The glass sheet as claimed in claim 1, wherein the information includes information related to a manufacturing site where the glass sheet has been manufactured and information related to a date of manufacturing of the glass sheet.

18. The glass sheet as claimed in claim 1, wherein the glass sheet is a soda lime glass sheet.

19. The glass sheet as claimed in claim 1, wherein the adjacent marking spots of the plurality of rectilinear sections are distributed according to a first pattern when the symbol is viewed via the main face of the glass sheet, wherein said adjacent marking spots of the plurality of rectilinear sections are also distributed according to said same first pattern when the symbol is viewed via the edge face of the glass sheet.

* * * * *